3,300,440
POLYESTER RESINS STABILIZED WITH
THIOPHOSPHATE ESTERS
Dusan C. Prevorsek, Princeton, N.J., assignor to The
Goodyear Tire & Rubber Company, Akron, Ohio, a
corporation of Ohio
No Drawing. Filed Mar. 2, 1964, Ser. No. 348,865
7 Claims. (Cl. 260—45.7)

This invention relates to an improvement in condensation polyester resins and to a method for preparing condensation polyesters having improved stability.

Highly polymeric polyesters are derived from glycols and dicarboxylic acids or ester-forming derivatives thereof by condensation reaction. In carrying out such reactions the reactants are treated under stringent conditions of elevated temperature and reduced pressure for considerable periods of time. The polymeric polyesters prepared develop a light yellow or brown color which is highly undesirable because such color is carried over into products made from the polyester resins. Development of any yellow or brown color is especially undesirable in fibers and films, which constitute a major use for condensation polyester resins. In addition to the development of color, condensation polyesters degrade on exposure to heat and to conditions that favor hydrolysis of ester compounds.

It is an object of the present invention to produce polyester resins of improved stability. Another object is to produce polyester resins having a very low degree of color. Another object is to provide a method of producing polyester resins having a low degree of color and which have good thermal and hydrolytic stability. Other objects will appear as the description of the invention proceeds.

According to the invention, highly polymeric condensation polyester resins having superior stability and improved color are produced by incorporating in such resins a thiophosphate compound.

The invention is illustrated in the following examples. Parts and percentage figures throughout the specification and claims are expressed on a weight basis unless otherwise stated.

*Example 1*

Fifty grams of a low molecular weight 60/40 ethylene terephthalate/ethylene isophthalate copolyester containing 0.03 percent of zinc acetate and 0.0024 percent of polymeric ethylene glycol titanate condensation catalyst and 0.1 percent of triphenyl phosphate as stabilizer were charged into a small glass reaction vessel and polymerized by condensation reaction by heating the mixture under nitrogen atmosphere at 280° C. at about one millimeter of mercury pressure. After five hours of reaction under these condensation polymerization conditions the polymer obtained had an intrinsic viscosity of 0.743 and a color of 2 as rated on a laboratory color scale. A control run having an intrinsic viscosity of 0.74 and made without color inhibitor has a color in the range of from 6 to 7 with condensation polymerization time of one and one-half hours. This example shows that triphenyl phosphate slows up the polymerization reaction appreciably although it is an effective color stabilizer.

*Example 2*

Fifty grams of low molecular weight copolyester of the kind used in Example 1 containing 0.3 percent of zinc acetate, 0.0024 percent of polymeric ethylene glycol titanate and 0.04 percent of phosphoric acid were polymerized under the same conditions used in Example 1. After six hours of reaction under these condensation polymerization conditions, the polymer formed had an intrinsic viscosity of 0.312 and a color of 1+. This shows that phosphoric acid also is an effective color stabilizing agent, but it greatly inhibits the polymerization reaction.

*Example 3*

5.98 pounds of dimethyl terephthalate, 4.12 pounds of dimethyl isophthalate, 7.10 pounds of ethylene glycol, 1.65 grams of zinc acetate dihydrate and 0.110 gram of polymeric ethylene glycol titanate were charged into a glass flask that was equipped with a stirrer, nitrogen inlet tube and a side arm condenser. Nitrogen gas was slowly passed over the mixture while it was stirred and slowly heated to 210 to 220° C. over a period of three hours while methanol distilled out of the mixture. The product formed was a low molecular weight polymer. It was divided into two equal portions, Portion I and Portion II.

Portion I was charged into a stainless steel reactor and 0.05 percent of triphenyl thiophosphate based on the weight of the polymer was added to it. The temperature of the mixture was slowly raised to about 275° C. as the pressure in the reactor was reduced to one millimeter of mercury pressure. Excess ethylene glycol distilled out of the mixture. The mixture was heated at 275° C. and one millimeter of mercury pressure for about 90 minutes to polymerize the low molecular weight polymer.

Portion II was also polymerized for comparison as a control run without any stabilizing agent. Data obtained on the two runs is set out in Table I below.

TABLE I

| Stabilizer | Polymerization Time, Minutes | Polymer Intrinsic Viscosity [1] | Polymer Color [2] |
|---|---|---|---|
| I—0.05% triphenyl thiophosphate | 208 | 0.573 | 1 |
| II—None | 150 | 0.623 | 3 |

[1] Intrinsic viscosity was determined according to customary procedure at 30.0° C. using a 60/40 phenol-tetrachloroethane mixture as solvent for the polymer.
[2] Color of the polymer was determined by comparing a sample of the polymer with a laboratory color scale in which color is progressively darker as the rating number increases.

The data of Table I clearly show the color stabilizing effect of the triphenyl thiophosphate.

In the examples the resin is prepared by starting with a low molecular weight polymer and condensing it and by reacting low alkyl esters of the acids with glycol, with the elimination of the lower alkyl alcohol and to form glycol esters or low molecular weight polymers which are polymerized under condensation polymerization conditions in the presence of a suitable catalyst to form high molecular weight linear polyester resins. The stabilizing agents of the invention can be incorporated in the resin by adding them to low molecular weight polyester, i.e., a polyester having an intrinsic viscosity of from about 0.1 to 0.2 measured in a 60/40 phenoltetrachloroethane mixed solvent at 30.0° C. and polymerizing it or by adding them to polyester forming reactants such as the lower alkyl esters of the acids and the glycol and reacting them to form high molecular weight polymer. Thus the stabilizing agents can be added to the original reactants, to the finished polyester resin or to the reactants at some intermediate stage in the preparation of the resins. It is generally preferred to add the stabilizer to the bis glycol esters or to the low polymer just prior to start of the condensation polymerization reaction.

The invention has been illustrated particularly with respect to stabilizing an ethylene terephthalate/ethylene isophthalate copolyester resin. The stabilizers are also effective in stabilizing other condensation polyester resins. Representative examples of such condensation polyester resins are resins derived from dicarboxylic acids or ester forming derivatives thereof and glycols, for example, polyethylene terephthalate, polytetramethylene terephthalate, polycyclohexanedimethanol terephthalate, polyethylene bibenzoate and copolyesters derived from a dicarboxylic acid and a mixture of glycols and copolyesters derived from a mixture of dicarboxylic acids and one or more glycols, such as copolyesters of terephthalic acid with another aromatic dicarboxylic acid and copolyesters of an aromatic dicarboxylic acid such as terephthalic acid with an aliphatic dicarboxylic acid. Dicarboxylic acids from which the resins can be derived are aliphatic dicarboxylic acids such as adipic acid, sebacic acid and azelaic acid; aromatic dicarboxylic acids such as orthophthalic acid, isophthalic acid, terephthalic acid, 2,5-dichloroterephthalic acid, bibenzoic acid and the naphthalic acids. The resins can be made from various glycols, including ethylene glycol and other glycols such as the propylene glycols and alkyl substituted propylene glycols such as neopentyl glycol and 2-methyl-2-ethyl-1,3-propane diol and the butylene glycols, pentamethylene glycol, hexamethylene glycol, decamethylene glycol, diethylene glycol 1,4-cyclohexane dimethanol and cyclic glycols such as 2,2,4,4-tetramethyl-1,3-cyclobutanediol. Ethylene glycol is a preferred glycol because of its low cost and ready availability.

The invention has been illustrated particularly with respect to the use of triphenyl thiophosphate as a color stabilizer. Other thiophosphate compounds can be used. Representative examples of such compounds are compounds of the general formula

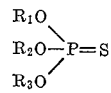

in which $R_1$ is selected from the group consisting of alkyl, halo substituted alkyl, cycloalkyl, halo substituted cycloalkyl, aralkyl, halo substituted aralkyl, aryl, halo substituted aryl, alkaryl and halo substituted alkaryl, and $R_2$ and $R_3$ are selected from the group consisting of hydrogen, alkyl, halo substituted alkyl, cycloalkyl, halo substituted cycloalkyl, aralkyl, halo substituted aralkyl, aryl, halo substituted aryl, alkaryl, and halo substituted alkaryl. Thus the R's can be alkyl radicals such as methyl, ethyl, propyl, butyl and amyl; haloalkyl such as chloromethyl, chloroethyl, chloropropyl, chlorobutyl, chloroamyl, bromomethyl, bromoethyl, bromobutyl, bromoamyl; cycloalkyl radicals such as cyclopentyl, cyclohexyl, chlorocyclopentyl, chlorocyclohexyl, bromocyclopentyl, bromocyclohexyl, aralkyl radicals such as benzyl, phenethyl, chlorobenzyl, chlorophenethyl, bromobenzyl, bromophenethyl; aryl radicals such as phenyl, naphthyl, biphenyl, chlorophenyl, chloronaphthyl, chlorobiphenyl, bromophenyl, bromonaphthyl and bromobiphenyl. Representative examples of stabilizers of the invention are methyl dihydrogen thiophosphate, dimethyl hydrogen thiophosphate, trimethyl thiophosphate, trichloromethyl thiophosphate, tribromomethyl thiophosphate, methyl ethyl hydrogen thiophosphate, chloromethyl ethyl hydrogen thiophosphate, dimethyl ethyl hydrogen thiophosphate, dichloromethyl ethyl hydrogen thiophosphate, diethyl hydrogen thiophosphate, triethyl thiophosphate, trichloroethyl thiophosphate, tribromomethyl thiophosphate, methyl ethyl n-propyl thiophosphate, chlorocyclohexyl dihydrogen thiophosphate, bromocyclohexyl dihydrogen thiophosphate, tri(cyclohexyl) thiophosphate, dimethyl n-butyl thiophosphate, dichloromethyl n-butyl thiophosphate, dibromomethyl n-butyl thiophosphate, cyclohexyl dihydrogen thiophosphate, phenyl methyl thiophosphate, di(chlorophenyl) methyl thiophosphate, di(bromophenyl) methyl thiophosphate, diphenyl ethyl thiophosphate, triphenyl thiophosphate, tritolyl thiophosphate, p-tolyl dimethyl thiophosphate, phenethyl dimethyl thiophosphate, chlorophenethyl dimethyl thiophosphate, bromo phenethyl dimethyl thiophosphat and tri phenethyl thiophosphate.

In the preparation of the polyester resins, various catalysts can be used. Suitable catalysts for the ester interchange reaction used to prepare the polyester resins are zinc acetate, manganese acetate, calcium acetate, and the alkali metal alcoholates. Catalysts suitable for the condensation reactions by which the high molecular weight polymers are prepared are soluble antimony compounds such as antimony trioxide, lead compounds such as lead acetate and litharge and titanium compounds such as titanium alcoholates and polymeric ethylene glycol titanate.

The amount of the stabilizer used can be varied over a wide range of concentrations. Generally the amount used will be from 0.01 to 0.5 percent by weight of the polyester resin used. The preferred amounts usable will be in the range of from 0.02 to 0.3 percent by weight of the polyester resin to obtain optimum stability in the resin.

The reactions by which the resins are prepared are in general carried out in accordance with the usual known techniques. Thus the reactions are preferably carried out in the absence of oxygen, generally in an atmosphere of inert gas such as nitrogen or the like, in order to lessen darkening and to make it possible to prepare a high molecular weight lightly colored or colorless product. The condensation reaction is carried out under reduced pressure, generally below 10 millimeters of mercury pressure, and usually at or below one millimeter of mercury pressure at a temperature in the range of from about 260 to 290° C. to form high molecular weight polyester having an intrinsic viscosity of at least 0.4 measured in a 60/40 phenol-tetrachloroethane mixed solvent at 30.0° C.

While certain representative embodiments and details have been shown for the purpose of illustrating the invention it will be apparent to those skilled in this art that various changes and modifications may be made therein without departing from the spirit or scope of the invention.

What I claim is:
1. A process for improving the stability of highly polymeric condensation polyesters derived from a dicarboxylic acid and a glycol which comprises incorporating in the polyester resin from 0.01 to 0.5 percent by weight based on the condensation polyester of a thiophosphate compound which has the formula

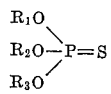

in which $R_1$ is selected from the group consisting of alkyl, halo substituted alkyl, cycloalkyl, halo substituted cycloalkyl, aralkyl, halo substituted aralkyl, aryl, halo substituted aryl, alkaryl and halo substituted alkaryl, and $R_2$ and $R_3$ are selected from the group consisting of hydrogen, alkyl, halo substituted alkyl, cycloalkyl, halo substituted cycloalkyl, aralkyl, halo substituted aralkyl, aryl, halo substituted aryl, alkaryl and halo substituted alkaryl radicals.

2. A process for preparing highly polymeric condensation polyesters derived from a dicarboxylic acid and a glycol which comprises mixing with condensation polyester forming reactants from 0.01 to 0.5 percent by weight based on the condensation polyester of a thiophosphate compound which has the formula

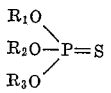

in which $R_1$ is selected from the group consisting of alkyl, halo substituted alkyl, cycloalkyl, halo substituted cycloalkyl, aralkyl, halo substituted aralkyl, aryl, halo substituted aryl, alkaryl and halo substituted alkaryl, and $R_2$ and $R_3$ are selected from the group consisting of hydrogen, alkyl, halo substituted alkyl, cycloalkyl, halo substituted cycloalkyl, aralkyl, halo substituted aralkyl, aryl, halo substituted aryl, alkaryl and halo substituted alkaryl radicals and reacting the reactants to form high molecular weight resin.

3. A process for preparing polymeric condensation polyesters derived from a dicarboxylic acid and a glycol which comprises incorporating in a low molecular weight polyester from 0.01 to 0.5 percent by weight based on the polyester of a thiophosphate compound which has the formula

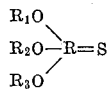

in which $R_1$ is selected from the group consisting of alkyl, halo substituted alkyl, cycloalkyl, halo substituted cycloalkyl, aralkyl, halo substituted aralkyl, aryl, halo substituted aryl, alkaryl and halo substituted alkaryl, and $R_2$ and $R_3$ are selected from the group consisting of hydrogen, alkyl, halo substituted alkyl, cycloalkyl, halo substituted cycloalkyl, aralkyl, halo substituted aralkyl, aryl, halo substituted aryl, alkaryl and halo substituted alkaryl radicals and polymerizing the low molecular weight polyester by condensation reaction to form high molecular weight polyester.

4. A stabilized polyester composition comprising a linear condensation polyester resin derived from a dicarboxylic acid and glycol containing from 0.01 to 0.5 percent by weight based on the condensation polyester of a thiophosphate compound which has the formula

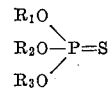

in which $R_1$ is selected from the group consisting of alkyl, halo substituted alkyl, cycloalkyl, halo substituted cycloalkyl, aralkyl, halo substituted aralkyl, aryl, halo substituted aryl, alkaryl and halo substituted alkaryl, and $R_2$ and $R_3$ are selected from the group consisting of hydrogen, alkyl, halo substituted alkyl, cycloalkyl, halo substituted cycloalkyl, aralkyl, halo substituted aralkyl, aryl, halo substituted aryl, alkaryl and halo substituted alkaryl radicals.

5. A composition according to claim 4 in which the polyester resin is polyethylene terephthalate.

6. A composition according to claim 4 in which the polyester resin is an ethylene terephthalate-ethylene isophthalate copolyester.

7. A polyethylene terephthalate composition containing from 0.01 to 0.5 percent based on the polyethylene terephthalate of triphenyl thiophosphate.

References Cited by the Examiner

UNITED STATES PATENTS 3,057,826   10/1962   Griffing _____ 260—45.7

DONALD E. CZAJA, *Primary Examiner.*

GEORGE F. LESMES, *Examiner.*

M. J. WELSH, *Assistant Examiner.*